United States Patent
Ghafourifar et al.

(10) Patent No.: US 9,819,621 B2
(45) Date of Patent: Nov. 14, 2017

(54) APPARATUS AND METHOD FOR OPTIMIZED MULTI-FORMAT COMMUNICATION DELIVERY PROTOCOL PREDICTION

(71) Applicant: Entefy Inc., Palo Alto, CA (US)

(72) Inventors: Alston Ghafourifar, Los Altos Hills, CA (US); Mehdi Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 14/985,721

(22) Filed: Dec. 31, 2015

(65) Prior Publication Data

US 2016/0119260 A1   Apr. 28, 2016

Related U.S. Application Data

(63) Continuation-in-part of application No. 14/141,551, filed on Dec. 27, 2013.

(51) Int. Cl.
*H04L 12/58* (2006.01)

(52) U.S. Cl.
CPC ............ *H04L 51/066* (2013.01); *H04L 51/16* (2013.01); *H04L 51/22* (2013.01); *H04L 51/32* (2013.01)

(58) Field of Classification Search
CPC ....... H04L 51/066; H04L 51/16; H04L 51/32; H04L 12/581; H04L 12/5835; H04L 51/22; G06F 17/30867; G06F 17/16; H04M 2201/60
See application file for complete search history.

(56) References Cited

U.S. PATENT DOCUMENTS

| | | |
|---|---|---|
| 5,481,597 A | 1/1996 | Given |
| 5,951,638 A | 9/1999 | Hoss |
| 6,101,320 A | 8/2000 | Schuetze |

(Continued)

FOREIGN PATENT DOCUMENTS

| | | |
|---|---|---|
| WO | 9931575 | 6/1999 |
| WO | 2013112570 A1 | 8/2013 |

*Primary Examiner* — Arvin Eskandarnia
*Assistant Examiner* — Matthew Ballard
(74) *Attorney, Agent, or Firm* — Blank Rome LLP

(57) ABSTRACT

This disclosure relates generally to apparatus, methods, and computer readable media for composing communications for computing devices across multiple formats and multiple protocols. More particularly, but not by way of limitation, this disclosure relates to apparatus, methods, and computer readable media to permit computing devices, e.g., smartphones, tablets, laptops, and the like, to send communications in a number of pre-determined and/or 'determined-on-the-fly' optimal communications formats and/or protocols. Determinations of optimal delivery methods may be intelligently based on the sender individually or the relationship with the sender in the context of a group of recipients— including the format of the incoming communication, the preferred format of the recipient and/or sender, and an optimal format for a given communication message. The techniques disclosed herein allow communications systems to become 'message-centric' or 'people-centric,' as opposed to 'protocol-centric,' eventually allowing consideration of message protocol to fall away entirely for the sender of the communication.

20 Claims, 15 Drawing Sheets

(56) References Cited

U.S. PATENT DOCUMENTS

| | | |
|---|---|---|
| 6,950,502 B1 | 9/2005 | Jenkins |
| 7,673,327 B1 | 3/2010 | Polis |
| 7,886,000 B1 | 2/2011 | Polis |
| 7,908,647 B1 | 3/2011 | Polis |
| 8,090,787 B2 | 1/2012 | Polis |
| 8,095,592 B2 | 1/2012 | Polis |
| 8,108,460 B2 | 1/2012 | Polis |
| 8,112,476 B2 | 2/2012 | Polis |
| 8,122,080 B2 | 2/2012 | Polis |
| 8,156,183 B2 | 4/2012 | Polis |
| 8,281,125 B1 | 10/2012 | Briceno |
| 8,296,360 B2 | 10/2012 | Polis |
| 8,433,705 B1 | 4/2013 | Dredze |
| 8,438,223 B2 | 5/2013 | Polis |
| 8,458,256 B2 | 6/2013 | Polis |
| 8,458,292 B2 | 6/2013 | Polis |
| 8,458,347 B2 | 6/2013 | Polis |
| 8,468,202 B2 | 6/2013 | Polis |
| 8,959,156 B2 | 2/2015 | Polis |
| 2002/0133509 A1 | 9/2002 | Johnston |
| 2002/0178000 A1 | 11/2002 | Aktas |
| 2002/0194322 A1 | 12/2002 | Nagata |
| 2004/0117507 A1 | 6/2004 | Torma |
| 2004/0137884 A1 | 7/2004 | Engstrom |
| 2004/0243719 A1 | 12/2004 | Roselinsky |
| 2004/0266411 A1 | 12/2004 | Galicia |
| 2005/0015443 A1* | 1/2005 | Levine ............... H04L 12/5835 709/204 |
| 2006/0193450 A1 | 8/2006 | Flynt |
| 2007/0130273 A1 | 6/2007 | Huynh |
| 2007/0237135 A1 | 10/2007 | Trevallyn-Jones |
| 2008/0062133 A1 | 3/2008 | Wolf |
| 2008/0088428 A1 | 4/2008 | Pitre |
| 2008/0261569 A1 | 10/2008 | Britt |
| 2009/0016504 A1 | 1/2009 | Mantell |
| 2009/0119370 A1 | 5/2009 | Stern |
| 2009/0177744 A1 | 7/2009 | Marlow |
| 2009/0181702 A1 | 7/2009 | Vargas |
| 2009/0271486 A1 | 10/2009 | Ligh |
| 2009/0292814 A1 | 11/2009 | Ting |
| 2009/0299996 A1* | 12/2009 | Yu .................... G06F 17/30867 |
| 2010/0057872 A1 | 3/2010 | Koons |
| 2010/0210291 A1 | 8/2010 | Lauer |
| 2010/0220585 A1 | 9/2010 | Poulson |
| 2010/0323728 A1 | 12/2010 | Gould |
| 2010/0325227 A1 | 12/2010 | Novy |
| 2011/0051913 A1 | 3/2011 | Kesler |
| 2011/0078247 A1 | 3/2011 | Jackson |
| 2011/0130168 A1 | 6/2011 | Vendrow |
| 2011/0194629 A1 | 8/2011 | Bekanich |
| 2012/0209847 A1 | 8/2012 | Rangan |
| 2012/0221962 A1 | 8/2012 | Lew |
| 2013/0018945 A1 | 1/2013 | Vendrow |
| 2013/0097279 A1 | 4/2013 | Polis |
| 2013/0151508 A1* | 6/2013 | Kurabayashi ....... G06F 17/2223 707/723 |
| 2013/0262852 A1 | 10/2013 | Roeder |
| 2013/0267264 A1 | 10/2013 | Abuelsaad |
| 2013/0304830 A1 | 11/2013 | Olsen |
| 2013/0332308 A1 | 12/2013 | Linden |
| 2014/0270131 A1 | 9/2014 | Hand |
| 2014/0280460 A1 | 9/2014 | Nemer |
| 2014/0297807 A1 | 10/2014 | Dasgupta |
| 2015/0039887 A1 | 2/2015 | Kahol |
| 2015/0281184 A1 | 10/2015 | Cooley |
| 2016/0087944 A1 | 3/2016 | Downey |

* cited by examiner

APPARATUS AND METHOD FOR OPTIMIZED MULTI-FORMAT COMMUNICATION DELIVERY PROTOCOL PREDICTION

CROSS REFERENCE TO RELATED APPLICATIONS

This application is a continuation-in-part to the commonly-assigned and co-pending nonprovisional patent application having U.S. patent application Ser. No. 14/141,551 filed Dec. 27, 2013, and entitled, "Apparatus and Method for Multi-Format Communication Composition" ("the '551 application"). The '551 application is also hereby incorporated by reference in its entirety.

TECHNICAL FIELD

This disclosure relates generally to apparatuses, methods, and computer readable media for composing communications for computing devices across multiple communications formats and protocols as intelligently determined using one or more context factors to determine the optimal delivery method for the communications.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to a communications experience that many users find fragmented and restrictive. Users desire a system that will provide ease of communication by sending an outgoing message created in whatever format was convenient to the composer, with delivery options to one or more receivers in whatever format or protocol that works best for them—all seamlessly from the composer's and recipient(s)'s perspective. With current communications technologies that remain "protocol-centric"—as opposed to "message-centric" or "people-centric"—such ease of communication is not possible.

In the past, users of communications systems first had to choose a communication format and activate a corresponding application or system prior to composing a message or selecting desired recipient(s). For example, if a person wanted to call someone, then he or she would need to pick up a telephone and enter the required phone number or directory in order to connect. If a person wanted to email a colleague, that person would be required to launch an email application before composing and sending the email. Further, while long-form text might be the most convenient format at the time for the composer, long-form text may not be convenient for the receiver—resulting in a delayed receipt of and/or response to the message by the receiver. With the multi-format communication composition techniques described herein, however, the user flow is much more natural and intuitive. First, the 'Sender' (e.g., a registered user of the multi-format, multi-protocol communication system), can select the desired recipient(s). Then, the Sender may compose the outgoing message (in any format, such as text, video recording, or audio recording). Next, the system (or the Sender, in some embodiments) intelligently chooses the delivery protocol for the communication, e.g., whether the communication is going to be sent via email, SMS, IM, or social media, etc. Finally, the outgoing message is converted into the desired outgoing message format (either by the Sender's client device or a central communications system server) and sent to the desired recipient(s) via the chosen delivery protocol(s).

According to the multi-format communication composition techniques described herein, the emphasis in the communication interface is on the "who" and the "what" of the communication—but not the "how." The multi-format communication composition system described herein takes care of the "how"—including an 'Optimal' option, as determined by a dedicated service in the central communication server, such as a service referred to herein as the 'Optimal Decision Engine,' which may be employed to deliver the outgoing communication to the desired recipient(s) in the most preferred way, e.g., either through preferences that the recipient(s) has specified via his or her profile in a multi-format communications network or through the communication protocol information regarding the desired recipient that is stored in the Sender's contact list.

The subject matter of the present disclosure is directed to overcoming, or at least reducing the effects of, one or more of the problems set forth above. To address these and other issues, techniques that enable seamless, multi-format communications via a single user interface are described herein.

DETAILED DESCRIPTION

Disclosed are apparatuses, methods, and computer readable media for composing communications for computing devices across multiple formats and multiple protocols. More particularly, but not by way of limitation, this disclosure relates to apparatuses, methods, and computer readable media to permit computing devices, e.g., smartphones, smart devices, tablets, wearable devices, laptops, and the like, to send communications in a number of pre-determined and/or 'determined-on-the-fly' communications formats and/or protocols via a single, seamless user interface.

Determinations of outgoing communication formats and/ or protocols may be based on, e.g., the format of the incoming communication, the preferred format of the recipient and/or sender of the communication, an optimal format for a given communication session/message, and/or economic considerations of format/protocol choice to the recipient and/or sender (e.g. awareness of paid SMS internationally). The techniques disclosed herein allow communications systems to become 'message-centric' and/ or 'people-centric,' as opposed to 'protocol-first,' eventually allowing consideration of message protocol to fall away entirely for the sender of the communication. With reference to the figures, embodiments of communication optimization schemes according to this disclosure are provided below.

Figure 1A:
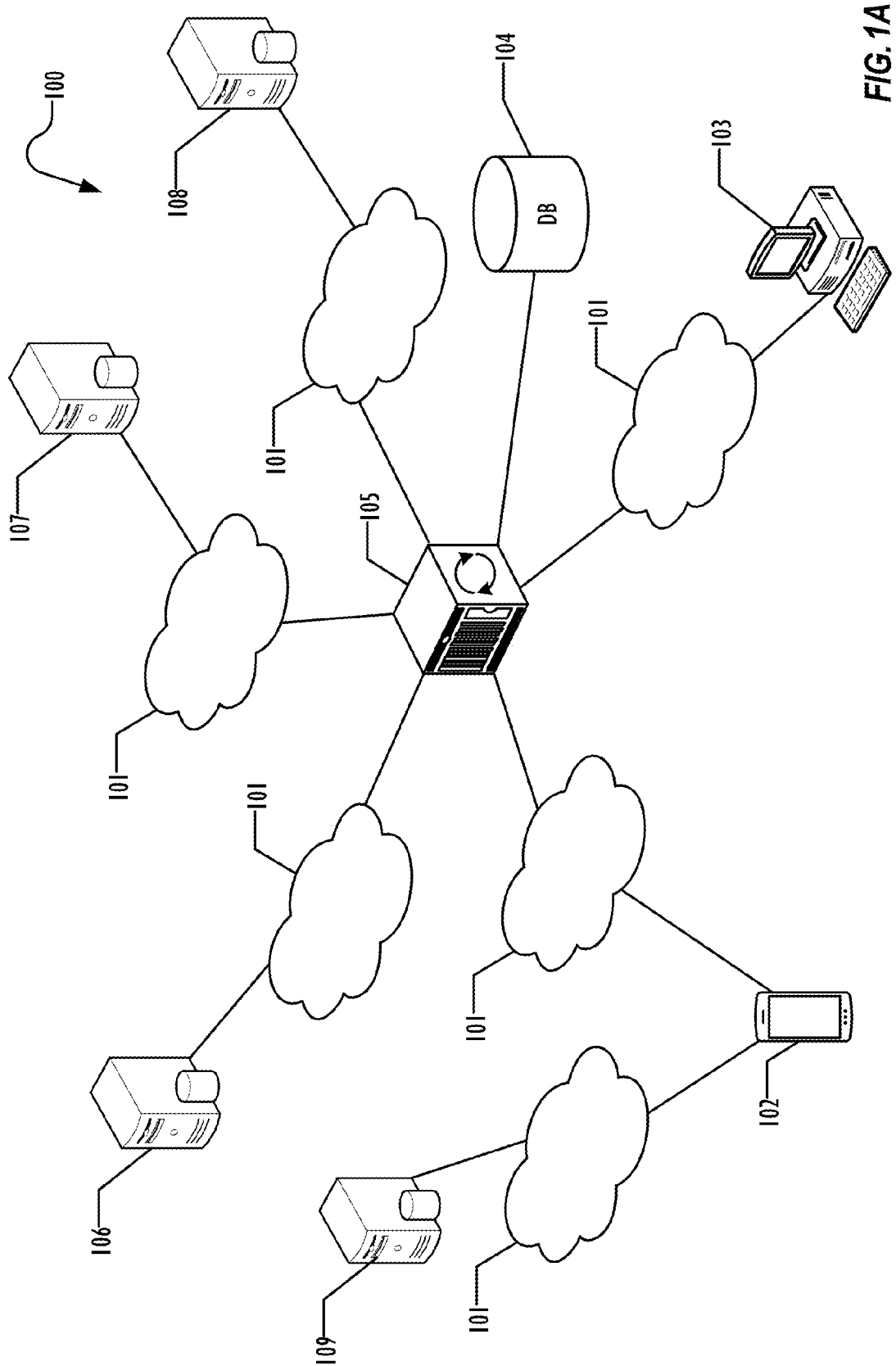
FIG. 1A is a block diagram illustrating a server-entry point network architecture infrastructure, according to one or more disclosed embodiments.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/ IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multiformat communication composition and inbox feed system to be described herein. In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system described herein have received any new email messages via the particular third-party email services. Server 107 represents a represents a third party instant message server (e.g., a YAHOO!® Messenger or AOL® Instant Messaging server). (AOL is a registered service mark of AOL Inc.) Third party instant messaging server 107 may also be periodically pinged by sync server 105 to determine whether particular users of the multiprotocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' users are communicating with one another via the multi-protocol, multi-format communication system itself, such communications may occur entirely via sync server 105, and third party servers 106-109 may not need to be contacted.

Figure 1B:
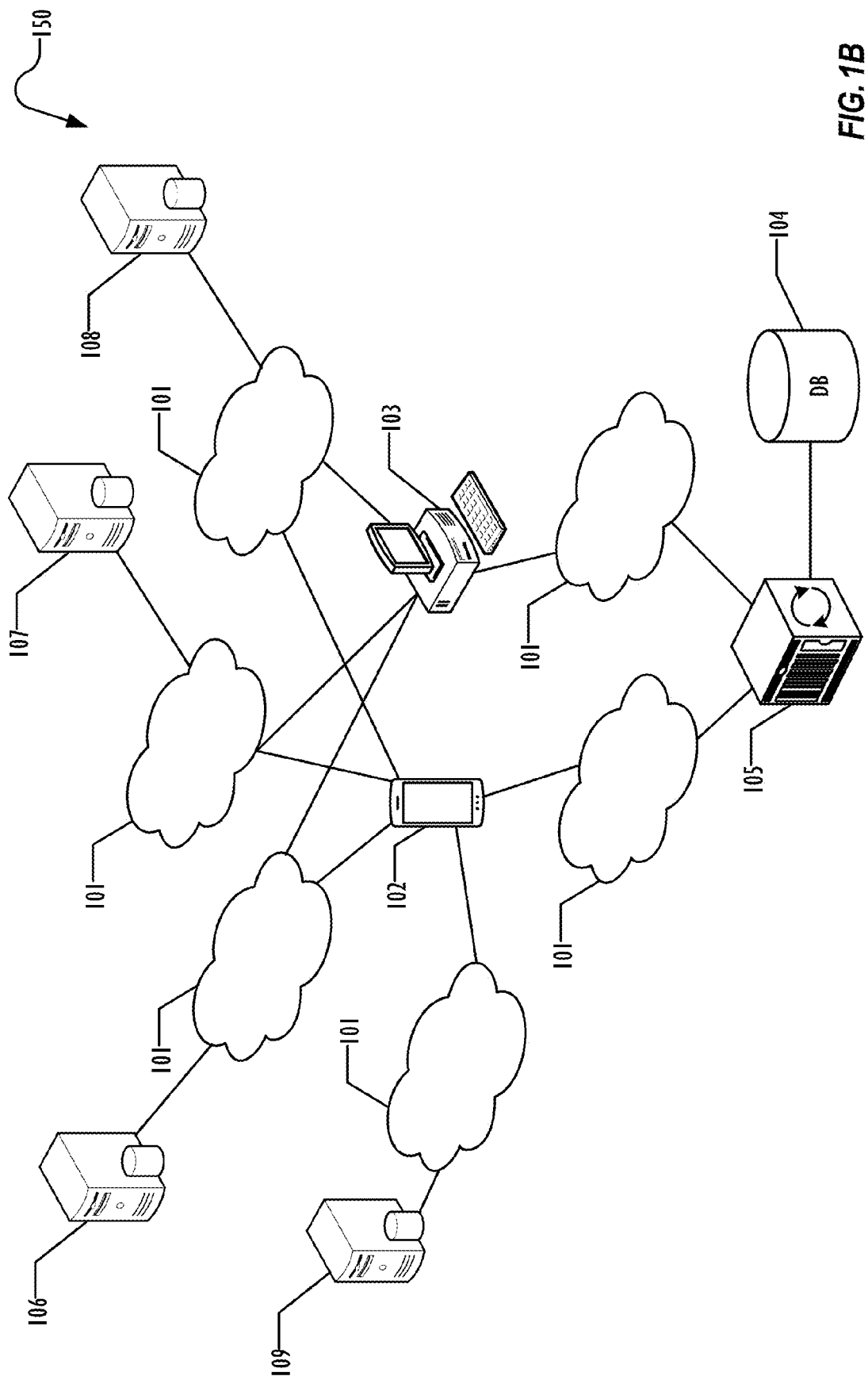
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
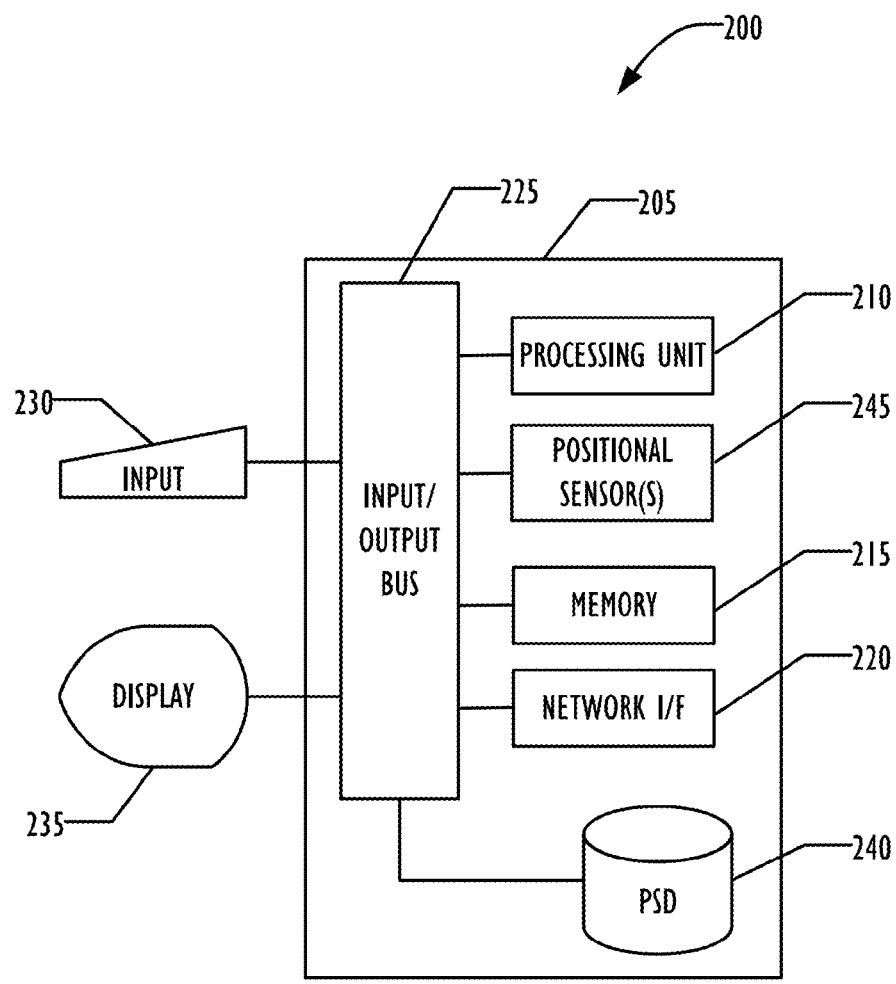
FIG. 2A is a block diagram illustrating a computer which could be used to execute the multi-format/multi-protocol communication optimization approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
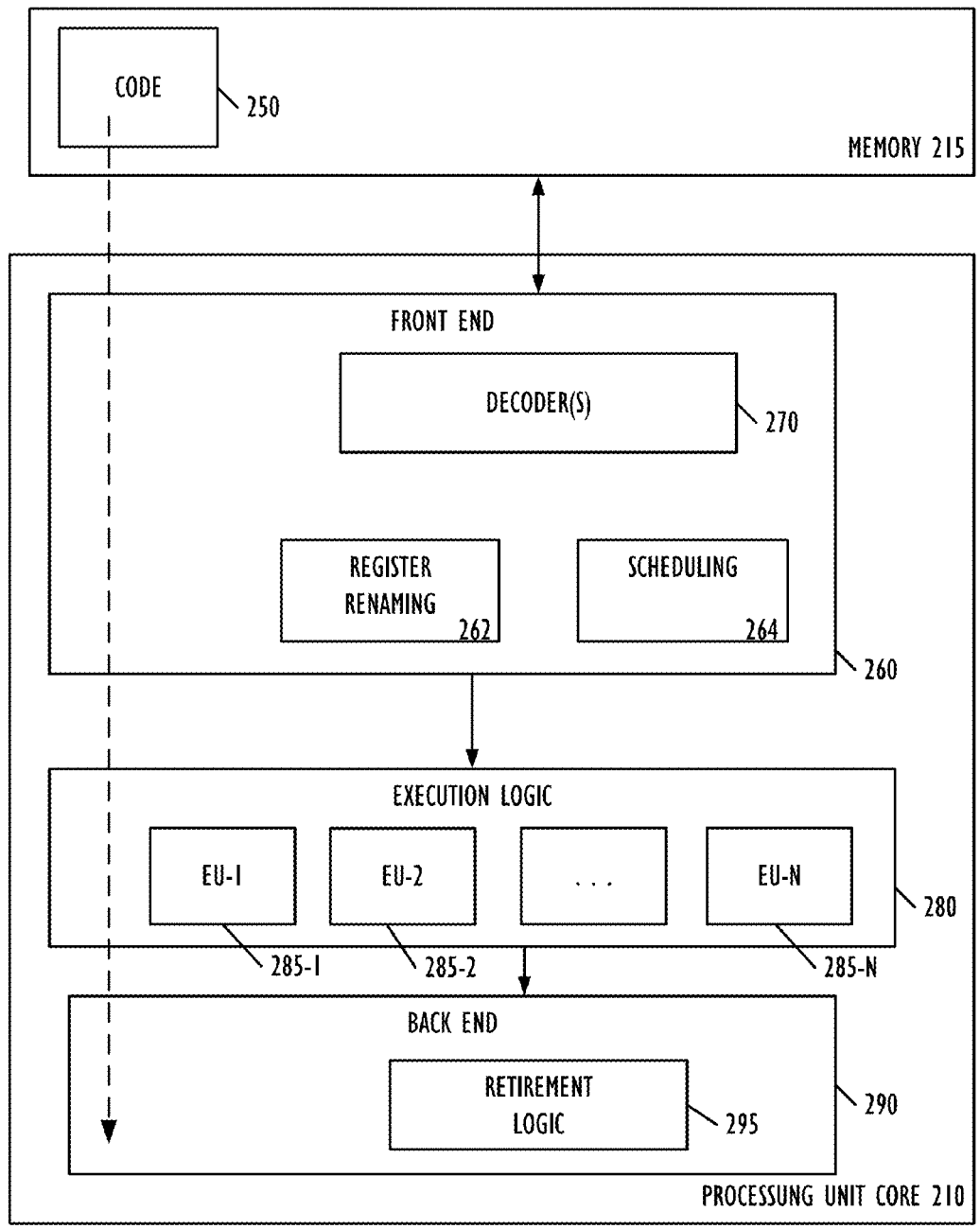
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Multi-Protocol, Multi-Format Inbox Feed

Figure 3A:
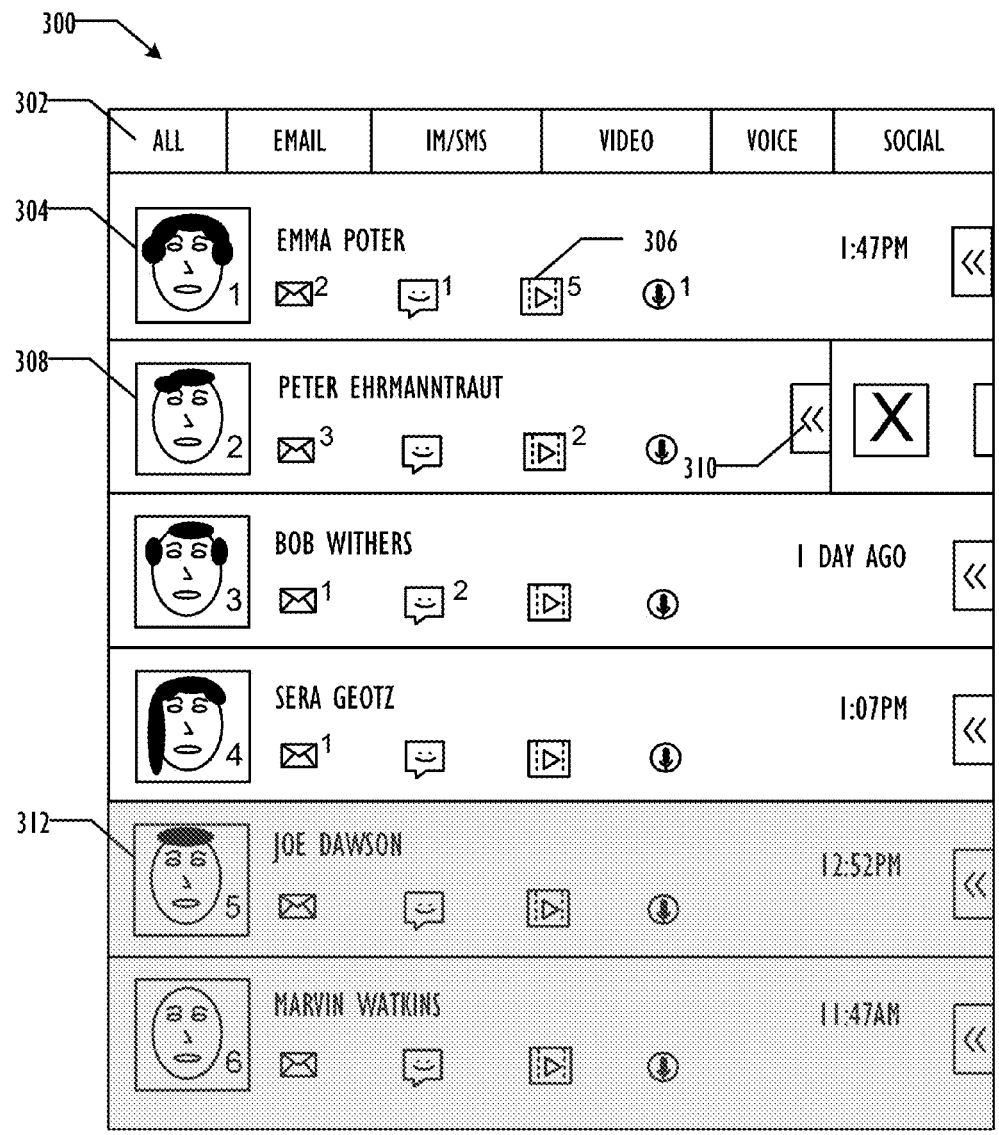
FIG. 3A shows an example of a multi-protocol, people-centric, multi-format inbox feed, according to one or more disclosed embodiments.

FIG. 3A shows an example of a multi-protocol, people-centric, multi-format inbox feed 300, according to one or more disclosed embodiments. The inbox feed 300 shown in FIG. 3A may, e.g., be displayed on the display of a mobile phone, laptop computer, or other computing device. In certain embodiments, elements of inbox feed 300 may be interacted with by a user utilizing a touchscreen interface or any other suitable input interface.

As is shown across the top row of the interface 302, the multi-format, multi-protocol messages received by a user of the system may be grouped by format (e.g., Email, IM/SMS, Video, Voice, etc.), or all formats may be combined together into a single, unified inbox feed, as is shown in FIG. 3A. Row 304 in the example of FIG. 3A represents the first "people-centric" message row in the user's unified inbox feed. As shown in FIG. 3A, the pictorial icon and name of the sender whose messages are listed in row 304 appear at the beginning of the row. The pictorial icon and sender name indicate to the user of the system that all messages that have been aggregated in row 304 are from exemplary user 'Emma Poter.' Note that any indication of sender may be used. Also present in row 304 are several graphical icons 306 that represent links to messages of different types that have been received from Emma Poter. For example, Emma Poter has sent the particular user whose inbox feed is shown in FIG. 3A two email messages, one instant message, five video messages, and one voice message. The user interface may utilize icons, as is shown in FIG. 3A, or it may use any other suitable form of indication, such as text, grids, charts, or any other form of personalized identification. The types of messages/communication used in the inbox feed may be selected or personalized, as well. The timestamp (e.g., 1:47 pm in row 304) may be used to indicate the time at which the most recently-received message has been received from a particular sender.

Moving down to row 308 of inbox feed 300, messages from a second user, Peter Ehrmanntraut, have also been aggregated into a single row of the feed. As is displayed on the right hand side of row 308 is reveal arrow 310. Selection of reveal arrow 310 may provide additional options to the user such as to reply, delay reply/delay send, forward, return a call, favorite, archive, or delete certain message from a particular sender. Further, the reveal action may conveniently keep the user on the same screen and allows for quick visual filtering of messages. Gestures and icon features may help the user with the decision-making process regarding the choice to reply, delay replying (including the time delaying of response across multiple protocols), delete, mark as spam, see a full message, translate, read, or flag a message as being unread. With respect to the "delay reply/delay send" option, the multi-protocol, multi-format communication system may determine, based on the determined outgoing message format and protocol, that a particular communication in a particular format should be delayed before being sent to the recipient. For example, a video or voice message may not be appropriate to send at midnight, and so the system may delay sending the message until such time as the recipient is more likely to be awake, e.g., 9:00 am. On the other hand, the outgoing message is in text format and being delivered via the SMS protocol, sending the message at midnight may be more socially-appropriate. Delay reply/delay send may also take into account the time zone of the recipient and choose a more socially-appropriate delivery time for a message based on the recipient's local time.

Finally, moving down to row 312, the 'grayed-out' characteristic of the row may be used to indicate that there are no remaining unread/unopened messages of any format or protocol type remaining from a particular sender. Alternately, each message type may be individually grayed out, indicating that there are no new messages of a particular type. It is to be understood that the use of a grayed out row is merely exemplary, and that any number of visual indicators may be used to inform the user of the device that no unread messages remain.

As may now be appreciated, the multi-protocol, people-centric, multi-format inbox feed 300 of FIG. 3A may provide various potential benefits to users of such a system, including: presenting email, text, voice, video, and social messages all grouped/categorized by contact (i.e., 'people-centric,' and not subject-people-centric, subject-centric, or format-centric); providing several potential filtering options to allow for traditional sorting of communications (e.g., an 'email format' view for displaying only emails); and displaying such information in a screen-optimized feed format. Importantly, centralization of messages by contact may be employed to better help users manage the volume of incoming messages in any format and to save precious screen space on mobile devices (e.g., such a display has empirically been found to be up to six to seven times more efficient that a traditional inbox format). Further, such an inbox feed makes it easier for a user to delete unwanted messages or groups of messages (e.g., spam or graymail). The order of appearance in the inbox feed may be customized as well. The inbox feed may default to showing the most recent messages at the top of the feed. Alternatively, the inbox feed may be configured to bring messages from certain identified "VIPs" to the top of the inbox feed as soon as any message is received from such a VIP in any format and/or via any protocol. The inbox feed may also alert the user, e.g., if an email, voice message, and text have all been received in the last ten minutes from the same person—likely indicating that the person has an urgent message for the user. The inbox feed may also identify which companies particular senders are associated with and then organize the inbox feed, e.g., by grouping all communications from particular companies together.

In other embodiments, users may also select their preferred delivery method for incoming messages of all types. For example, they can choose to receive their email messages in voice format or voice messages in text, etc.

Figure 3B:
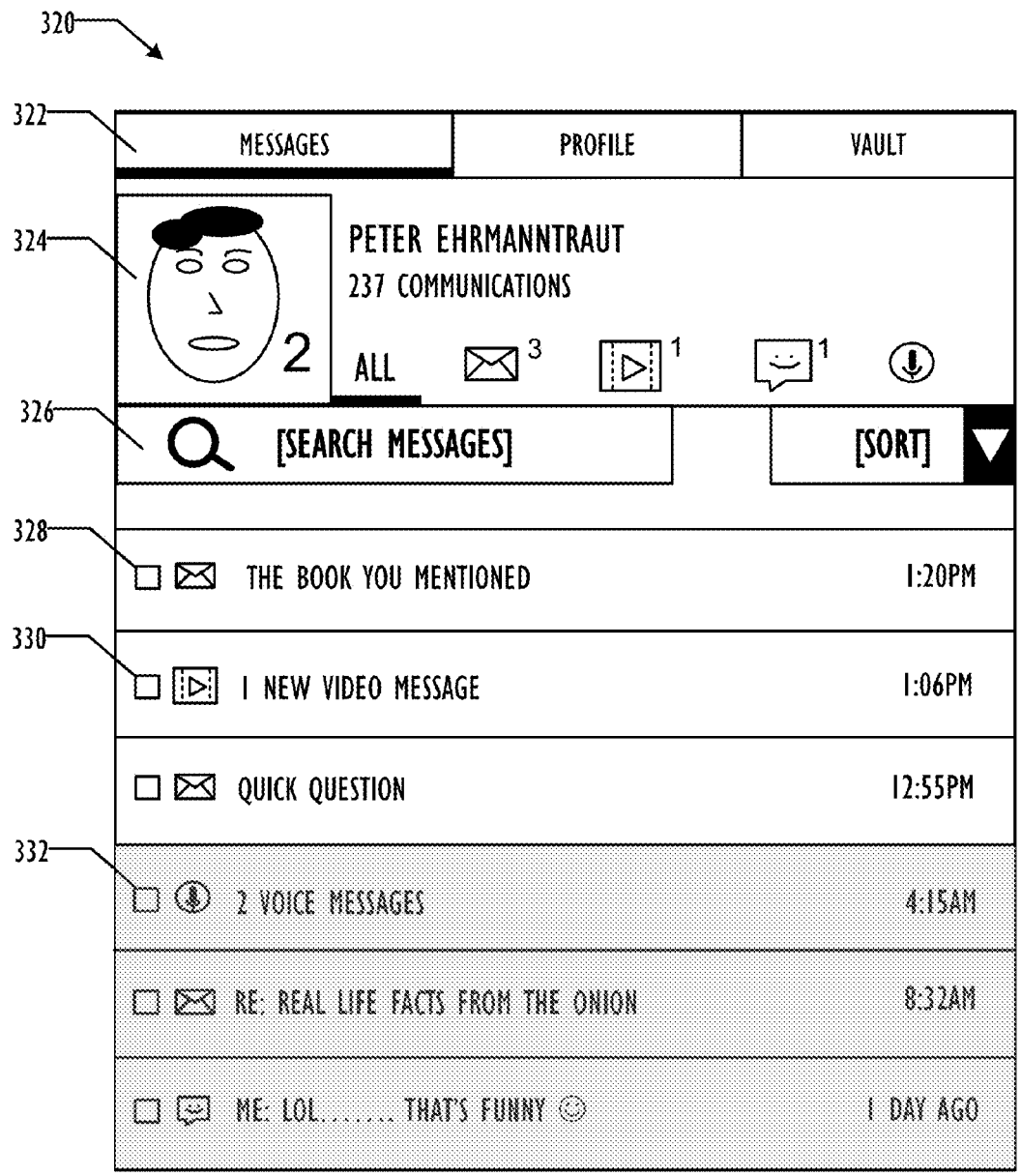
FIG. 3B shows an example of a multi-protocol, multi-format inbox feed for messages to and from a particular user, according to one or more disclosed embodiments.

Referring now to FIG. 3B, an example of a multi-protocol, multi-format inbox feed for messages to and from a particular user 320 is shown, according to one or more disclosed embodiments. As is shown across the top row of the interface 322, the messages from a particular user, in this case 'Peter Ehrmanntraut' may be displayed in a single multi-format, multi-protocol message feed. Row 322 in the example of FIG. 3B also presents the user with the opportunity to select the particular sender's 'Messages,' 'Profile,' or 'Vault' storage, which is a document repository of files shared between the user and a particular sender (e.g., email attachments, MMS, etc.). As shown in FIG. 3B, the pictorial icon 324 and name of the sender whose messages are listed in interface 320 appear at the top of the communications page. Also present in interface 320 is search icon 326, which may be activated to search across all message formats and protocols (e.g., including voice and video messages) from a particular sender for a particular search term(s) or topic. Message items may also be sorted in the feed by various characteristics such as time of receipt, format, or other content and/or semantic-based ranking schemes. Moving down to the messages portion of interface 320, checkbox 328 represents the first email message received from user Peter Ehrmanntraut, whereas checkbox 330 represents the first new video message from user Peter Ehrmanntraut. Finally, grayed-out checkbox 332 represents an aggregation of voice messages that have already been listened to by the user.

Figure 3C:
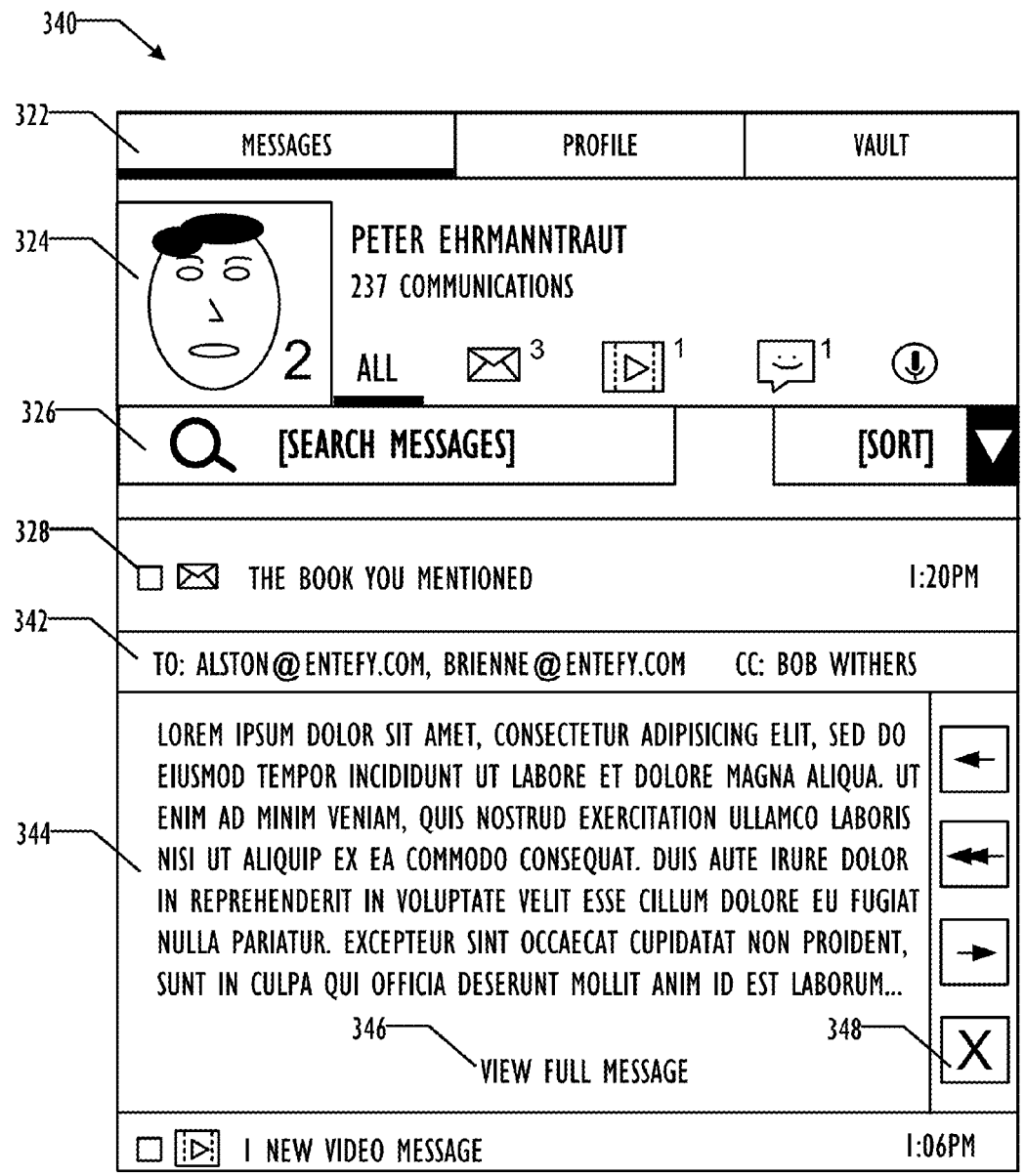
FIG. 3C shows an example of a preview pane for a multi-protocol, multi-format inbox feed for messages to and from a particular user, according to one or more disclosed embodiments.

Referring now to FIG. 3C, an example of a preview pane 340 for a multi-protocol, multi-format inbox feed for messages to and from a particular user is shown, according to one or more disclosed embodiments. As is displayed in FIG. 3C, the message associated with checkbox 328 has been opened to provide a more in-depth preview of the associated email text. According to some embodiments, the recipients 342 are listed out above the body 344 of the email, and a link 346 may be activated that causes the application to retrieve the full email message from either the system's sync server or third party email servers. The interface may also provide a number of preview quick action buttons 348 to be performed on the message that is being previewed, e.g., reply, reply all, forward, delete, etc.

Figure 3D:
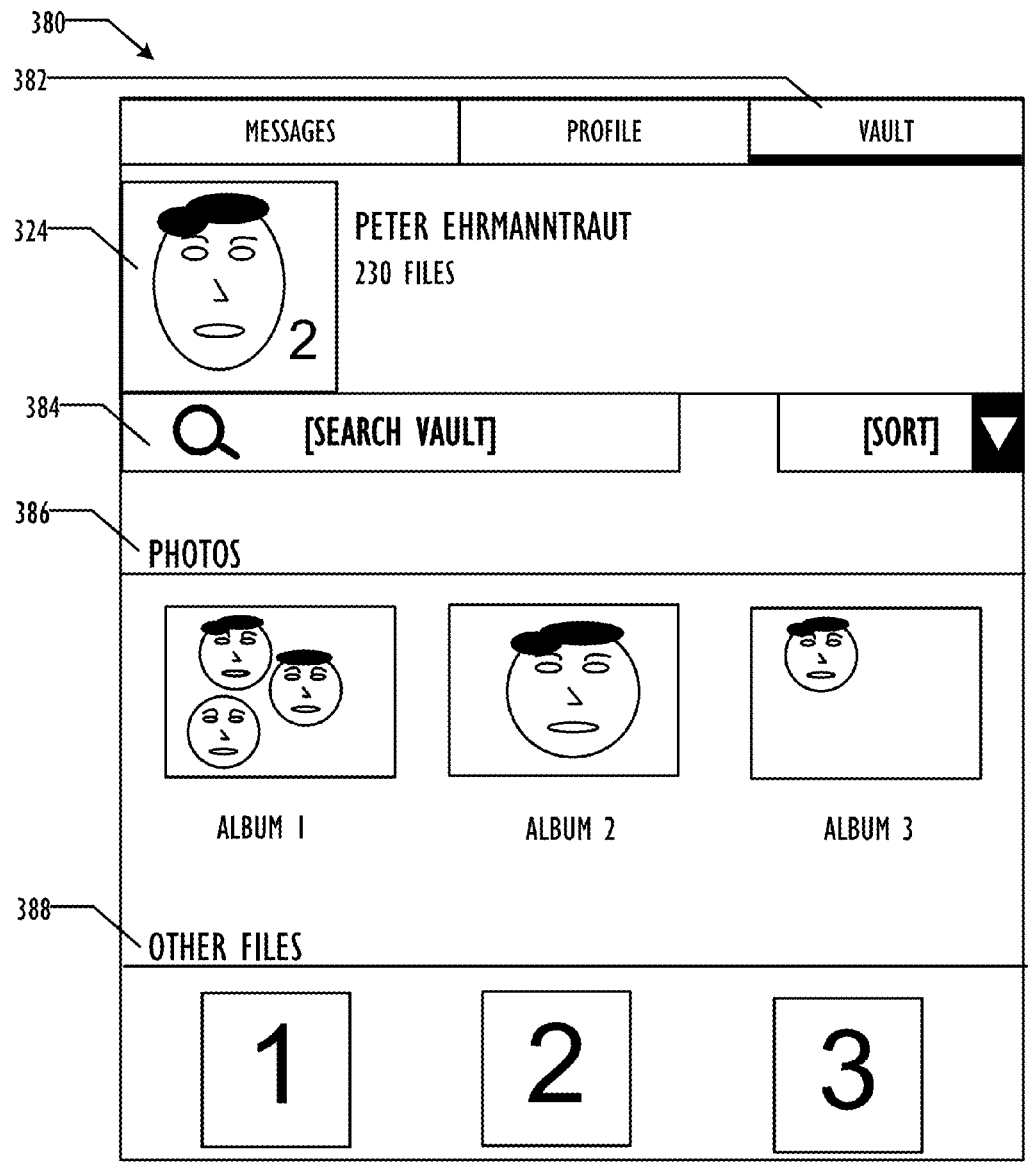
FIG. 3D shows an example of a document repository page for a particular user, according to one or more disclosed embodiments.

Referring now to FIG. 3D, an example of a document repository page 380 for a particular user is shown, according to one or more disclosed embodiments. Row 382 in the example of FIG. 3D presents the user with the opportunity to select the particular sender's 'Vault' page, which is a document repository of files shared between user and the particular sender (e.g., email attachments, MMS, etc.). As with the messages interface, a searching functionality 384 may be provided, which searches the documents associated with the particular user's Vault. A user's Vault may include multimedia files 386, such as photos, in addition to other files 388, such as word processing and presentation documents.

Multi-Protocol, Multi-Format Communication Composition User Interface

Figure 3E:
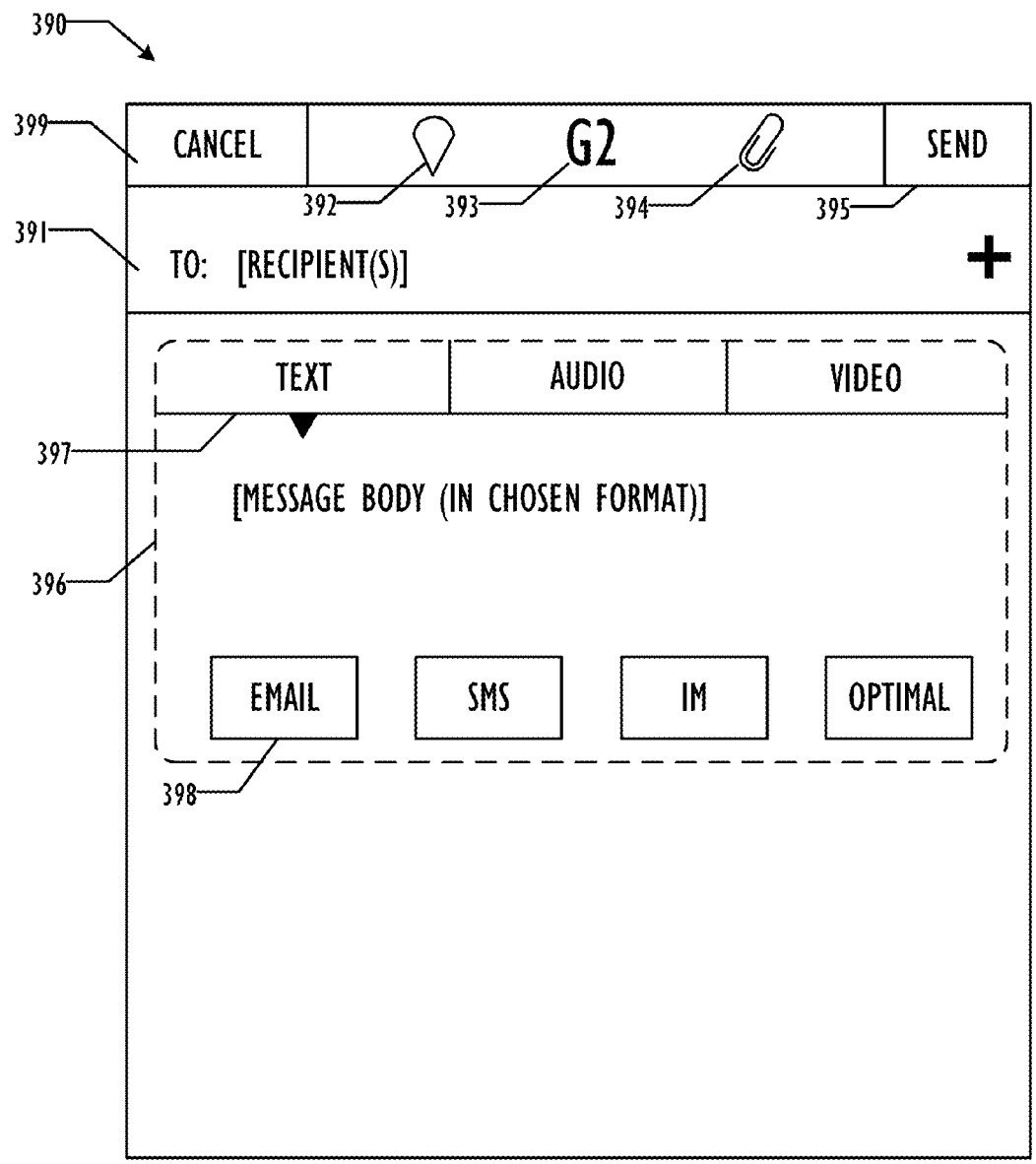
FIG. 3E shows an example of a multi-protocol, multi-format communication composition user interface, according to one or more disclosed embodiments.

Referring now to FIG. 3E, an example of a multi-protocol, multi-format communication composition user interface 390 is shown, according to one or more disclosed embodiments. The top row of interface 390 in the example of FIG. 3E presents the user with several options related to the composition of a given communication. For instance, icon 392 may provide the user with the ability to geo-tag his or her location onto the message being sent. Icon 393 may be used to indicate that a message has a special status, such as a 'poll question' or other 'request for recommendation' with a response requested by the sender. Such special status messages may optionally be sent to 'tiers' of contacts (e.g., first-tier relationship, second-tier relationships, etc.) or even the general public, as opposed to particular contacts. Icon 394 may be used to attach one or more file attachments to the message being composed, button 399 may be used to cancel the message being composed, and button 395 may be used to send off the message to the one or more recipients specified in the "To:" field 391.

Message box 396 may be used by the user to enter his or her message any desired communications format or protocol that the system is capable of handling. For example, a text message may be entered by activating icon 397 and using an on-screen keyboard or the like. Alternately, an audio message or a video message may be recorded by activating the other icons across the top row of message box 396. Once the message has been composed in the desired format, the user may utilize the row of icons 399 across the bottom of message box 396 to select the desired delivery protocol for the outgoing communication. As shown in FIG. 3E, those protocols may include, e.g., email, SMS/MMS/IM, or Optimal. As may be understood, the selection of desired delivery protocol may necessitate a conversion of the format of the composed message. For example, if a message is entered in audio format, but is to be sent out in a text format, such as via the SMS protocol, the audio from the message would be digitized, analyzed, and converted to text format before sending via SMS (i.e., a speech-to-text conversion). Likewise, if a message is entered in textual format, but is to be sent in voice format, the text from the message will need to be run through a text-to-speech conversion program so that an audio recording of the entered text may be sent to the desired recipients in the selected voice format via the appropriate protocol, e.g., via an email message.

The selection of the "Optimal" delivery option may have several possible implementations. The selection of output message format and protocol may be based on, e.g., the format of the incoming communication, the preferred format or protocol of the recipient and/or sender of the communication (e.g., if the recipient is an 'on-network' user who has set up a user profile specifying preferred communications formats and/or protocols), an optimal format or protocol for a given communication session/message (e.g., if the recipient is in an area with a poor service signal, lower bit-rate communication formats, such as text, may be favored over higher bit-rate communications formats, such as video or voice), and/or economic considerations of format/protocol choice to the recipient and/or sender (e.g., if SMS messages would charge the recipient an additional fee from his or her provider, other protocols, such as email, may be chosen instead).

Other considerations may also go into the determination of an optimal delivery option, such as analysis of recent communication volume, analysis of past communication patterns with a particular recipient, analysis of recipient calendar entries, and/or geo-position analysis. Other embodiments of the system may employ a 'content-based' determination of delivery format and/or protocol. For example, if an outgoing message is recorded as a video message, SMS may be de-prioritized as a sending protocol, given that text is not an ideal protocol for transmitting video content. Further, natural language processing (NLP) techniques may be employed to determine the overall nature of the message (e.g., a condolence note) and, thereby, assess an appropriate delivery format and/or protocol. For example, the system may determine that a condolence note should not be sent via SMS, but rather translated into email or converted into a voice message. Thus, the techniques disclosed herein allow communications systems to become 'message-centric,' as opposed to 'protocol-first,' eventually allowing consideration of message protocol to fall away entirely for the sender of the communication.

Another beneficial aspect of the multi-protocol, multi-format communication composition system described herein is the ability to allow the user to send one message to the same recipient in multiple formats and/or via multiple protocols at the same time (or with certain formats/protocols time delayed). Likewise, the multi-protocol, multi-format communication composition system also allows the user the ability to send one message to multiple recipients in multiple formats and/or via multiple protocols. The choice of format/protocol for the outgoing message may be made by either the system (i.e., programmatically) or by the user, e.g., by selecting the desired formats/protocols via the user interface of the multi-protocol, multi-format communication composition system.

Figure 4:
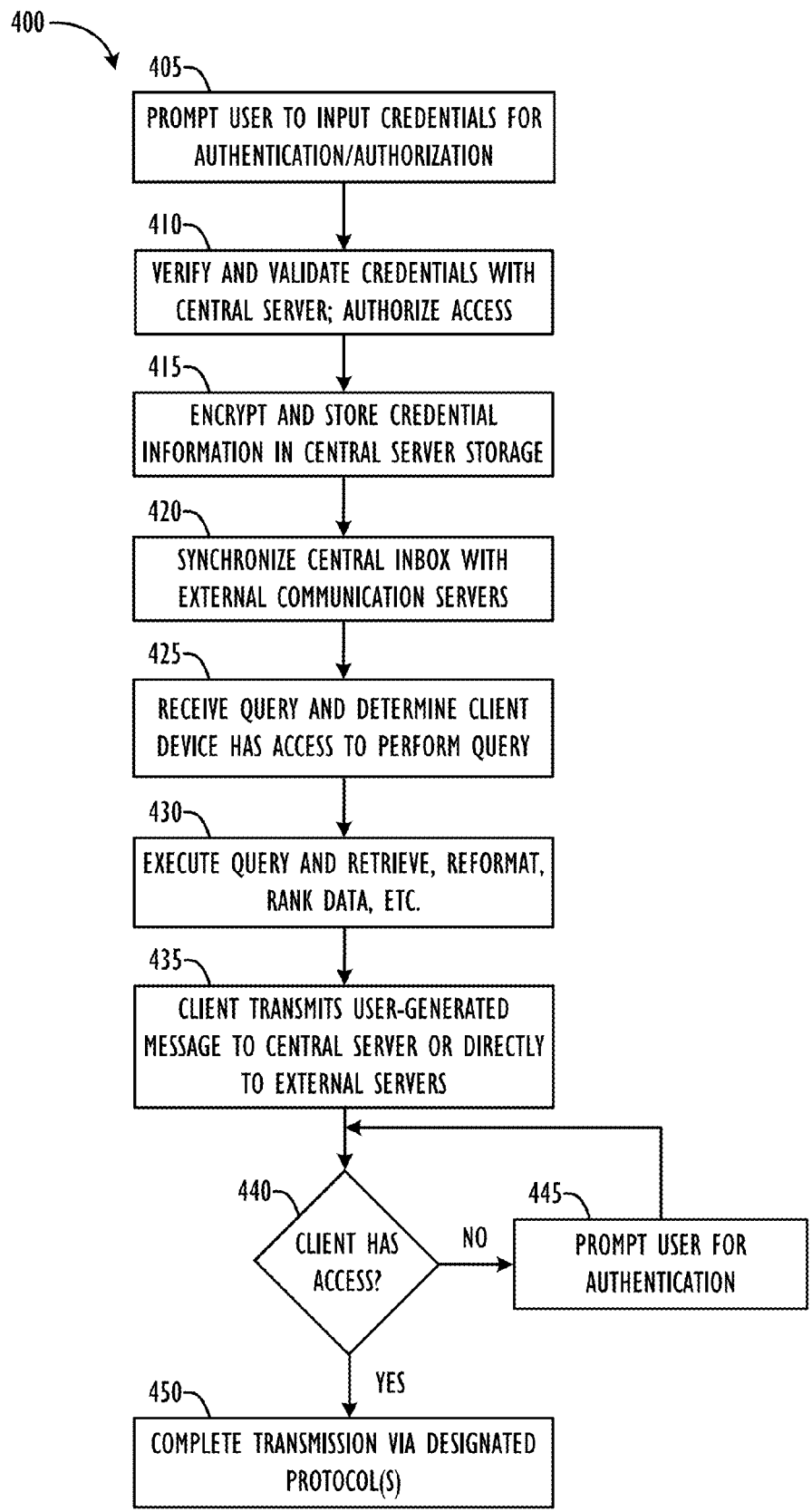
FIG. 4 is a flowchart of one embodiment of a method for populating a multi-protocol, people-centric, multi-format inbox feed, according to one or more disclosed embodiments.

FIG. 4 shows a flowchart 400 of one embodiment of a method for populating a multi-protocol, people-centric, multi-format inbox feed, according to one or more disclosed embodiments. First, the system may prompt the user to input his or her credentials so that he or she may be authenticated and authorized (Step 405). Next, the sync server 105 and/or third-party servers 106-109 may verify and validate the user's credentials as being authorized to receive communications associated with a particular account(s) tied to a particular messaging service(s) (Step 410). Next, the user's credentials are encrypted and stored at the sync server 105 so that the user's messages may continue to be retrieved by the system (Step 415). Once the user's credentials have been verified and stored, the system may attempt to synchronize the user's multi-protocol, people-centric, multi-format unified messaging inbox feed with the various external communication servers hosting the user's messages from the various third-party messaging services, e.g., by using one or more third-party credentials of the first user stored at the sync server (Step 420). Next, the system may receive a query from a particular user's client device (e.g., to pull new communications directed to the user) and determine that the client device has access to perform the query (Step 425). Assuming the client device has access, the query will be executed, and the results will be retrieved and optionally reformatted, ranked, etc., according to the user's and/or system's preferences (Step 430). One example of a formatted and sorted query result set is shown in the exemplary user interface of FIG. 3A.

When the user desires to transmit a user-generated message, e.g., via the exemplary user interface of FIG. 3E, the process may resume at Step 435 by the client device transmitting the user-generated message either to the system's sync server or directly to the third-party communications servers. At that point, it may again be verified that the client device has access to send the message(s) (Step 440). If the client device does not have access, the user will again be prompted to enter his or her authentication credentials (Step 445). Once proper authentication has been established, the transmission of the user-generated message may be completed via the designated protocol(s). The nature and type of the protocols may be determined, e.g., in accordance with one or more of the various rules and preferences discussed above with reference to FIG. 3E.

User Interface-Driven Search Query Generation

Figure 5:
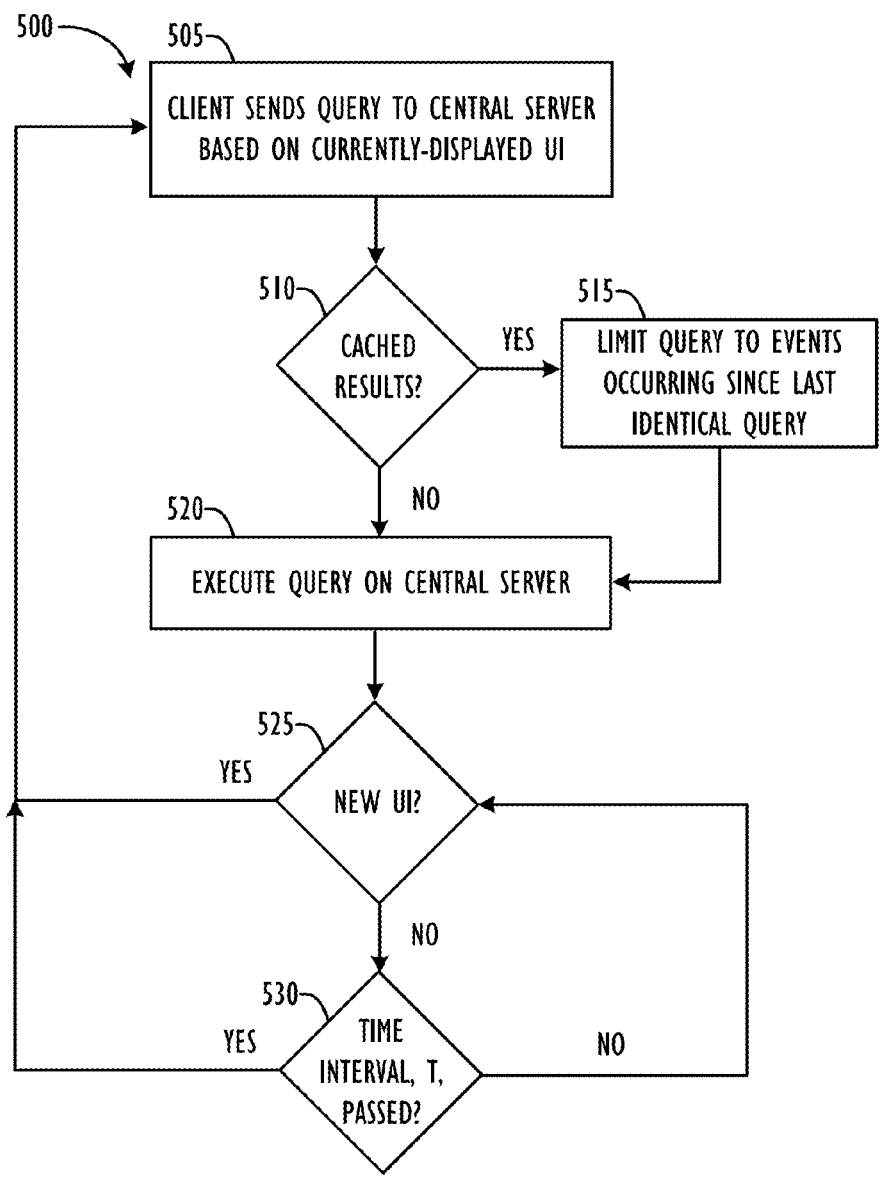
FIG. 5 is a flowchart of one embodiment of a method for processing a user interface-driven query, according to one or more disclosed embodiments.

FIG. 5 shows a flowchart 500 of one embodiment of a method for processing a user interface-driven query, according to one or more disclosed embodiments. First, a client device may send a query to a central communications system server, such as sync server 105, based on the status of the currently-displayed user interface (UI) on the client device (Step 505). For example, with respect to the user interface 300 shown in FIG. 3A, the selection of a row in the currently-displayed UI for sender 'Emma Poter' could be associated with one or more system-defined "tags" that would be used by the system to generate a query for messages from user 'Emma Poter.' Likewise, changing the UI to the 'Video' tab in row 302 of user interface 300 would generate a query for only messages in a video format, etc. Next, the system may determine if there are cached results for the query that the client device is currently trying to send (Step 510). If there are cached results at Step 510, the query may be limited to events occurring since the last identical query was issued by the client device (Step 515), and then the limited query may be executed by the central communication system server (Step 520). If there are no cached results at Step 510, then the full query may simply be executed by the central communication system server (Step 520).

After some amount of time, the client device may poll the inbox feed application to determine whether there is a new UI displaying on the client device (Step 525). If there is a new UI being displayed on the client device, the process 500 may return to Step 505 so that the client application may create and send a new query to the central communications system server based on the currently-displayed UI. If, instead, there is not a new UI being displayed on the client device, the client application may determine whether a given time interval, t, has passed since the last query that was sent to the central communications system server (Step 530). If the time interval, t, has not passed since the last time the UI was updated, the client application may simply return to Step 525 and continue to poll the inbox feed application to determine whether there is a new UI displaying on the client device. If, instead, the time interval, t, has passed since the last time the UI was updated, the client application may simply return to Step 505 so that the client application may create and send a new query to the central communications system server based on the currently-displayed UI. It is to be understood that the exemplary method shown in flowchart 500 may also be achieved by use of a "push-based" system, too, wherein the inbox feed application may push information to the client device periodically without the need for the client device to poll the server.

Figure 6:
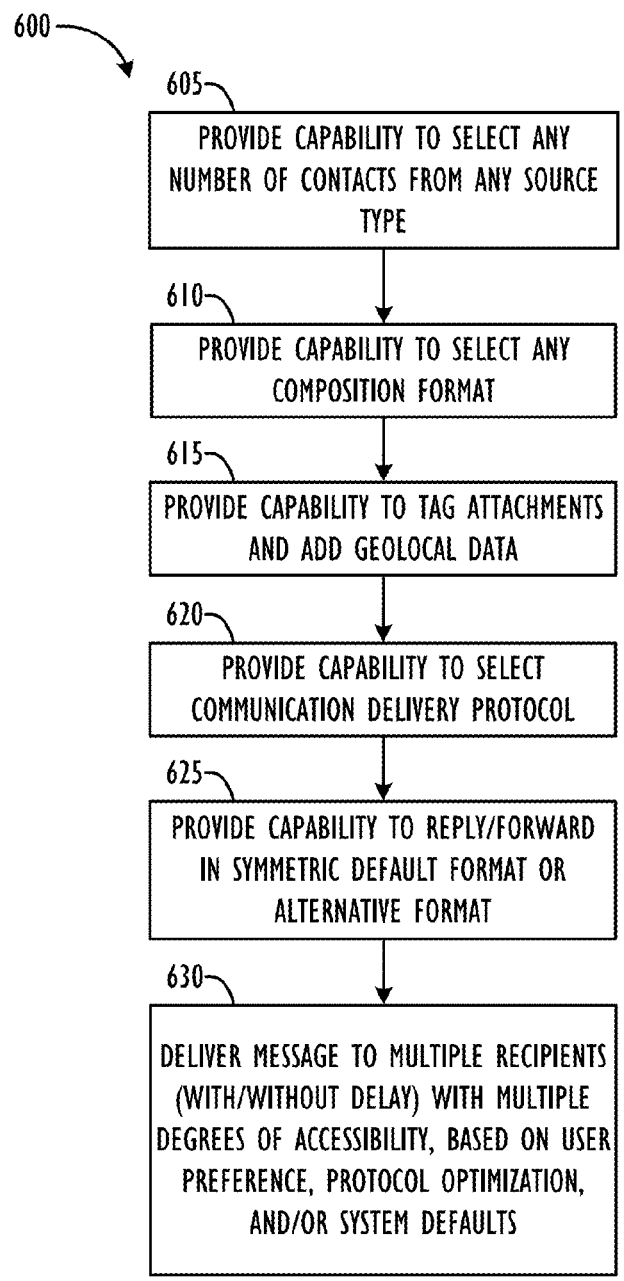
FIG. 6 is a flowchart of one embodiment of a method for creating a multi-protocol, multi-format communication transmission, according to one or more disclosed embodiments.

FIG. 6 shows a flowchart 600 of one embodiment of a method for creating a multi-protocol, multi-format communication transmission, according to one or more disclosed embodiments. First, the user interface of the client application may present the user with the capability to select any number of contacts from any source type (Step 605). Next, the user interface of the client application may present the user with the capability to select any composition format (Step 610). Next, the user interface of the client application may present the user with the capability to tag any desired attachments and/or geo-local data with the outgoing message (Step 615). Next, the user interface of the client application may present the user with the capability to select the desired communication delivery protocol (Step 620). Next, the user interface of the client application may present the user with the capability to reply/forward a given message in symmetric default format (i.e., the same format that the message was received in) or an alternative format (Step 625). Finally, the system may deliver the message to the selected recipient(s) in the selected/determined format(s). As described above in reference to FIG. 3E, the outgoing message format may be sent with or without delay, may have multiple degrees of accessibility, may be based on user preference, protocol optimization, and/or system defaults.

Optimal Delivery Selection

As mentioned previously, the Optimal delivery option is the selection of output message format and protocol based on the format of the incoming communication, the preferred format or protocol of the recipient and/or sender of the communication, an optimal format or protocol for a given communication session/message, and/or economic considerations of format/protocol choice to the recipient and/or sender. Many factors, preferences and historic usage comprise the input into the implementation that effectuates this option. The Optimal delivery option may be selected by the Sender's client device or by a central communication server running the Optimal Decision Engine.

The Optimal Decision Engine does not require that all 'Participants' (sender(s) & receiver(s)) in any given message or conversation be registered users, or "on-network," of the multi-format communication network described herein in order to provide the initial registered Sender (also known as the 'Composer') with an intelligent prediction as to the optimal delivery path for each recipient(s). The Optimal Decision Engine could use information such as calendar information showing whether the recipient is in a meeting, recipient position or motion information (e.g., whether the recipient is driving, walking, sleeping, etc.), or historic communication patterns as a way to determine format or protocol.

In cases where a message or conversation contains more than one intended recipients, and the Sender activates the Optimal delivery option, the Optimal Decision Engine may be instantiated to evaluate the best delivery method of the given message for each recipient as individual parties as well as in a group-based relationship context. For example, based on historical patterns of communication, it can be determined by the Optimal Decision Engine that Sender frequently communications with recipients A, B, and C, each using personal email addresses. In addition, the Optimal Decision Engine can leverage similar historical transaction patterns to assess that Sender frequently using another protocol/address when communicating with recipients A, B, and C as a single group. Therefore, using this first method (based primarily on historic data patterns), the Optimal Decision Engine is able to provide intelligent, context-aware suggestions on preferred message delivery method with only Sender as a registered user of the multi-format, multi-protocol communication network.

When one Sender and at least one recipient are registered users, or "on-network," of the multi-format, multi-protocol communications network, then, in addition to using traditional formats or protocols, messages sent through the multi-format, multi-protocol communication composition system described herein may also reach recipients via an established 'on-network' format or protocol.

Figure 7:
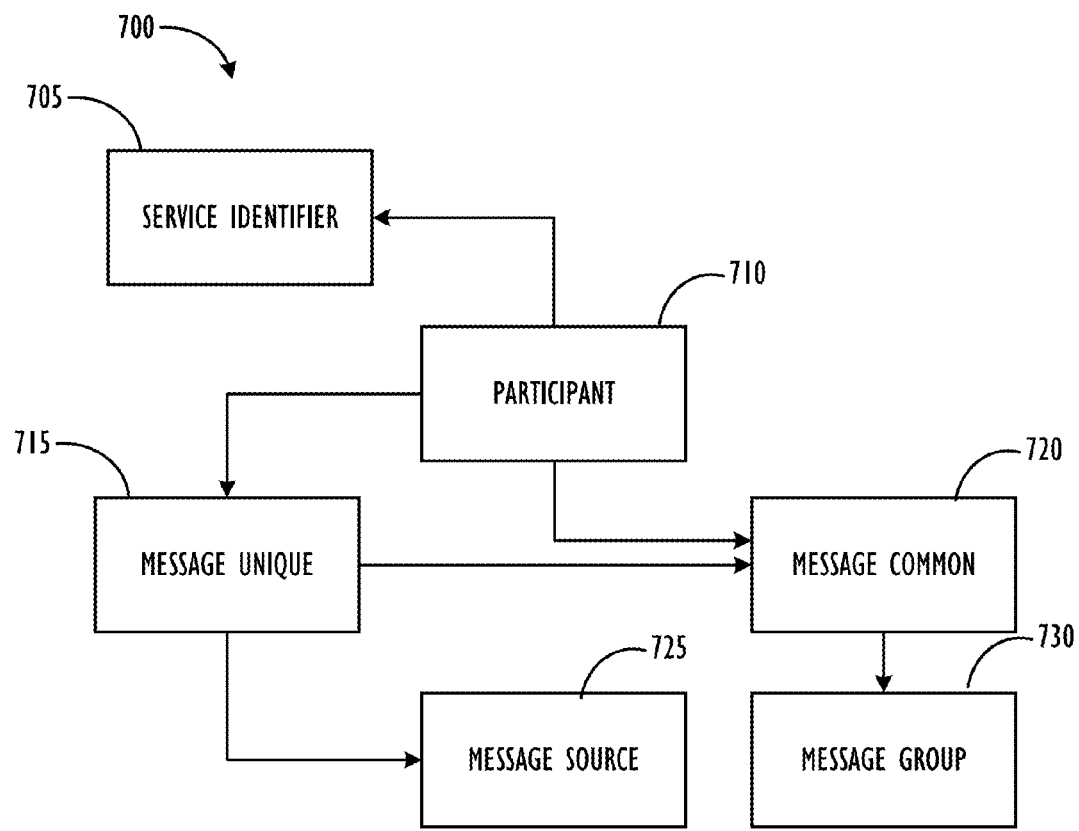
FIG. 7 is a block diagram of one embodiment of a Universal Message Object, according to one or more disclosed embodiments.

FIG. 7 shows a block diagram 700 of one embodiment of a Universal Message Object (UMO), according to one or more disclosed embodiments. The block diagram 700 describes the relationship between various components of data required to make the optimal delivery option possible. It should be appreciated that the UMO facilitates not only the communication between 'on-network' and 'off-network' users, but also facilitates the backflow of updating relevant conversation histories based on the message format and communication protocol utilized.

Participant 710 objects represent an "on-network" or "off-network" users. Participant 710 objects correspond to any people identified in the traditional email format fields of "To," "From," "Cc," and "Bcc." However, the Participant 710 objects are not limited to this, as a Participant 710 may be any user engaged in the conversation, and is relational to the service being used as the underlying communication protocol.

Service Identifier 705 object represents the service utilized by a single Participant 710 object in the delivery of a format over a communication protocol. For each "To", "From," "Cc," and "Bcc" associated with a message, there is a Participant 705 object containing a Service Identifier 705 indicating which service was used as the underlying format and communication protocol. The Service Identifier include data related to the delivery of the message, including the type of the service, and the address. In the case of an SMS text message, a Service Identifier 705 object would have the type of "sms" and the address would be respective telephone number. The Service Identifier 705 object implies a format and communication protocol unique to that indicated service.

Message Unique 715 is the representation format and communication protocol specific format for a message. For every message sent using the Optimal delivery method, one or more Message Unique 715 objects may be instantiated. Message Unique 715 objects contain the format and communication protocol specific data gathered during the Optimal delivery process. For example, time stamps of sent and received, based on the communication protocol are stored in the object. Additionally, in instances where the format and communication protocol are limited in some fundamental way, e.g. TWITTER® messages limited to 140 characters and SMS text message 160 character limit, it may be necessary to send multiple messages across these communication protocols to fully convey the Sender's intended message. For this purpose, multiple Message Unique 715 objects would be instantiated to track the transmitted content.

The Message Common 720 object is the message that an "on-network" user views in their inbox feed. For every user message sent, there are common components present in all formats and communication protocols. For efficiency, these common components are extracted and contained in one object. Because of this efficiency, there is one Message Common 720 object for every message sent by the Sender. For example, the Message Common 720 object may store the body of the message, as well as the time sent at the moment the Sender selects 'send,' not the 'sent time' as reported by the underlying communication protocol. This has the advantage of presenting one view to the Sender and recipient(s), while resolving minor discrepancies from the underlying communication protocol.

The Message Source 725 object is a representation of the Message Unique 715 object in a Javascript object notation (JSON) format. The Message Source 725 object has a one to one relationship with the Message Unique 715 object.

Message Group 730 object is a representative identifier that coordinates a Message Common 720 object. The purpose of a Message Group 730 object is to enable multi-protocol communication and establish a relationship between those messages. There is a one to one relationship between the Message Group 730 object and the Message Common 720 object.

As multiple multi-protocol communication messages are being represented in this data model, it enables the system to truly facilitate a multi-protocol multi-format communication system. The system tracks each conversation by the Message Group 730 object relating to the Message Common 720 and then all the individual Message Unique 715 objects that relate to the Message Common 720. By tracking all the Message Unique 715 objects with the Message Group 730 objects, it is possible to build a cross-protocol communication history. This history includes all communications from any given Participant 710 object across multiple Message Unique 715 objects with different Service Identifier 705 objects. Stated another way, the UMO can track and correlate historic communications across multiple protocols and formats utilizing the Message Group 730 objects, in conjunction with the other UMO objects. With this the UMO can track frequency of communication method, time of day of communication, historic rates of response, and patterns of group communication.

To enable the optimal delivery option, the UMO may be converted into an extensible format to allow for the representation, and subsequent conversion, of the dissimilar components. Javascript object notation (JSON) is a format that allows for a flexible field enumeration, as well as parsers and database conversion tools. In this embodiment, fields from the multiple objects of the Universal Message Object can be related and combined to create a unified view of the UMO and its components. Below, code Example 1 is demonstrative of a UMO implemented in JSON.

Example 1

```
{
    "id": "545436576657",
    "body": {
        "text": "Hey guys, we are modifying company policy regarding
email messages tomorrow, so please be on the lookout for a
followup",
        "html": "<p> Hey guys, we are modifying company policy
regarding email messages tomorrow<table><row> , so please be on
the lookout for </row><row> a followup</row></table>
</p>"
    },
    "createdOn": "2012-10-09T20:30:40.678Z",
    "date": "2012-10-09T20:30:40.678+00:00",
    "headers": {
    "x-mailer": "coolcompany.com"
    "participants": {
        "from": {
            "id": "63423324",
            "name": "Bob Jones",
            "address": "bob.jones@coolcompany.com",
            "type": "email"
        },
        "to": {
            "id": "1139178368",
            "name": "Sam Smith",
            "address": "5553625143"
            "type": "sms"
        }
    }
}
```

The conversion of any incoming messages to a common format allows for more efficient extraction of fields used in by any predicative data models. Put another way, the common format is an intermediary format for more efficient processing inside the multi-format, multi-protocol communication system.

Figure 8:
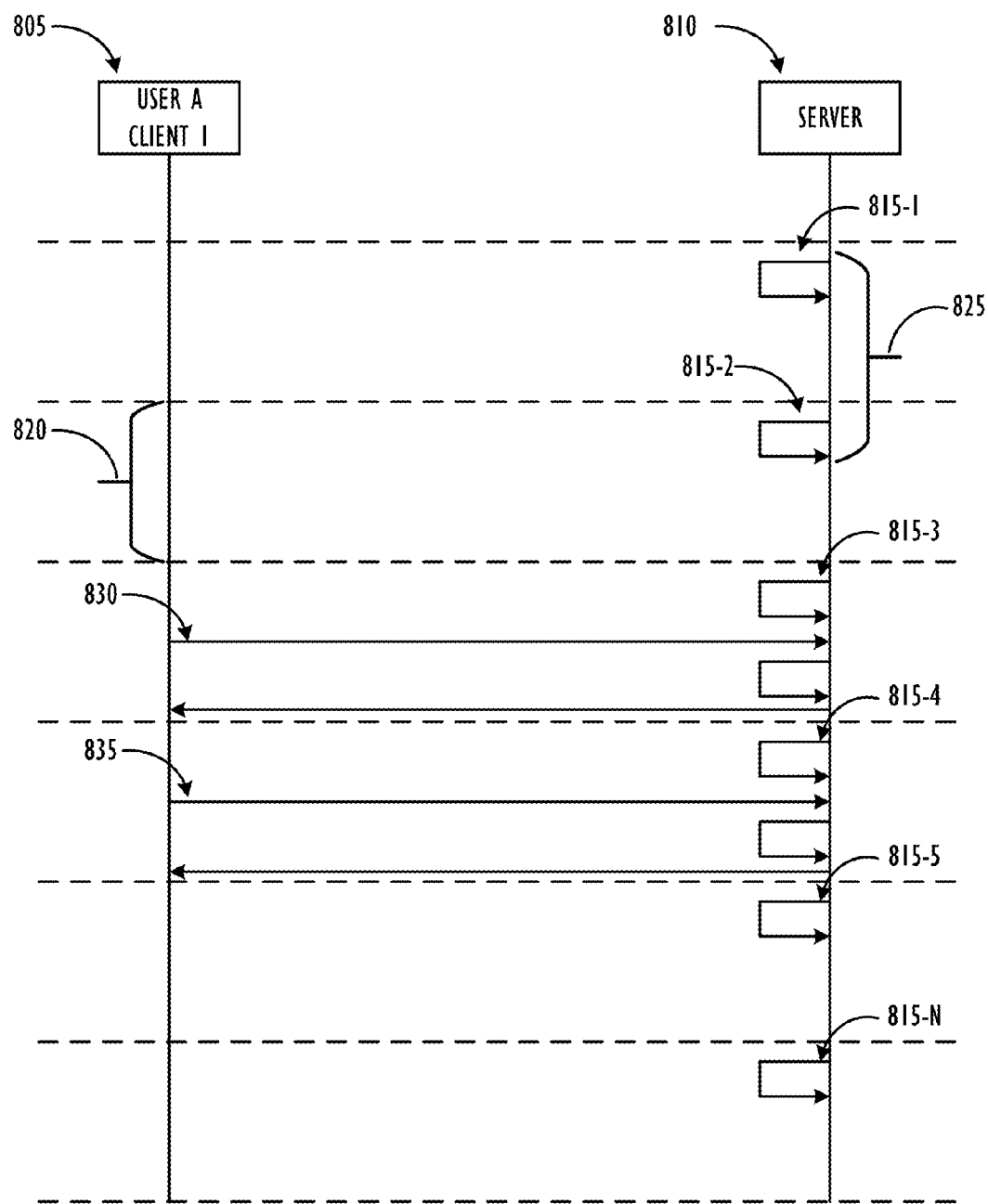
FIG. 8 is a sequence diagram of one embodiment of a method for updating a system with data points used to determine optimal delivery selection, according to one or more disclosed embodiments.

FIG. 8 shows a sequence diagram depicting one embodiment of a method for updating a system with data points used to determine optimal delivery selection, according to one or more disclosed embodiments.

User A utilizes client 1 805. Client 1 805 communicates with a server 810. The communication synchronizes optimal data transmission method between the server 810 and multiple clients in the context of a user. In this embodiment, user A utilizes only client 1 805. In another embodiment, user A may use multiple clients. At given calculation intervals 725, the server calculates an optimal delivery format 815-1 through 815-N for user generated messages that are partially dependent on time. Put another way, time is an input into a function that generates the optimal delivery selection. The optimal delivery selection is the resultant output of a predictive time-based data model. The predictive time-based data model analyzes historic patterns of communication of the user and recipients. These patterns include the context and frequency of the messaging. The context of the messages may include geo locational information, time of day, and content of the message itself. The predictive time-based data model utilizes these patterns to determine an intersection of the patterns of both the user and the recipients, to determine the optimal delivery option for both. The patterns based on content, may be defined to apply only in terms of one contextual element, or a combination of multiple elements. As time varies, so does the optimal delivery selection. The calculation intervals 825 for client 1 825 are relatively short. However, both synchronization intervals are greater than or equal to a minimum time interval 820.

When user A utilizes client 1 805 in sending a message to a recipient, the message is passed on to the server 810. Client 1 805 and the server 810 participate in an exchange 830, 835. In this embodiment, the exchange 830, 835 is synchronous, however in other embodiments, it may be asynchronous. The exchange 830, 835 involves the delivery of the message from client 1 805 to the server 810, the server 810 calculating an optimal delivery format 815-1 through 815-N based on the content and context of the received message, and providing a synchronized response indicating a new optimal delivery selection. In this embodiment, the frequency of the client 1 and server exchange 830, 835 shape the calculation intervals 825 for client 1 805. As more messages are received at the server 810 from client 1 805, the calculation intervals 825 for client 1 805 become more frequent, providing a larger data set to generate a more precise optimal delivery selection.

Figure 9:
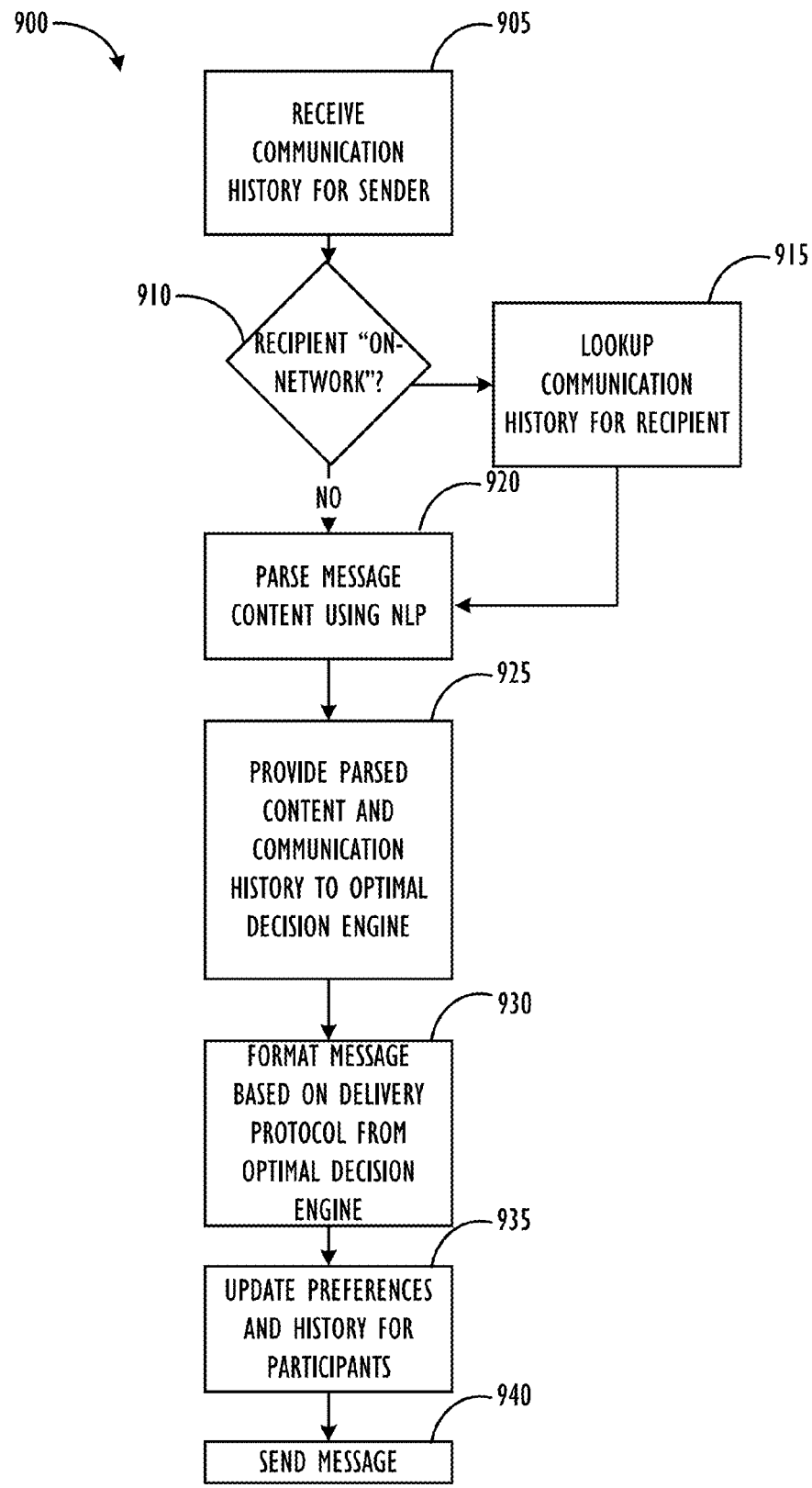
FIG. 9 is a flowchart of one embodiment of a method for determining an optimal protocol for transmitting a message to a recipient, according to one or more disclosed embodiments.

FIG. 9 is a flowchart of one embodiment of a method for determining an optimal protocol for transmitting a message to a recipient. This flowchart is one embodiment of the exchange 830, 835 of FIG. 8. The steps depicted here may, e.g., take place after the system has received a message from the Sender to one or more desired recipients. First, the system receives communication history for the Sender (Step 905). For example, communication history may include user preferences that may be previously defined rules based on how the Sender likes to receive only emails after 11 pm. Communication history includes how the Sender communicated last with the intended recipient, or when how the Sender communicated with the recipient at the same time over a previous time period.

The system then evaluates if the recipient is "on-network" (Step 910). Recipient(s) on network, like the Sender, have previously defined rules as well as stored historical context. If the recipient(s) is "on-network" their communication history is also retrieved (Step 915) in a similar manner to that of the Sender.

The flows then converge in the parsing of the message content using NLP (Step 920) techniques. This includes extracting keywords. The NLP may be targeting keyword generation that is indicative of past communication, or context that may be used to appropriately determine the optimal mechanism for delivery.

The system then provides the NLP generated keywords, all available communication history, including all available preference data to the Optimal Decision Engine (Step 925). In this embodiment, the Optimal Decision Engine may utilize a predictive time-based data model, built based on the historical context and the parsed message itself. Factorization machine, support vector machines, or other machine learning techniques may be utilized to effectuate the predictive time-based data model.

After the Optimal Decision Engine determines an appropriate delivery protocol based on the input factors, the system formats the message (Step 930) for delivery by the determined protocol. The formatting includes moving the content into the body of the message and preparing it for dispatch.

After the system successfully formats the message for the specified delivery protocol, the preferences and communication history for the user are updated (Step 935) in the database as an input data point later used to predict the Sender's method of response. Additional data may be stored in the database including frequency of the Sender's messages, the time of day of the messages, the rates of response to messages, and patterns of group communication. Finally the system sends the message (Step 940). Alternatively, the system may update the preferences and history for the Sender and the recipient(s) (Step 935) after the sending of the message, to verify the actual transmission of the message.

Examples

The following examples pertain to further embodiments.

Example 1 is a non-transitory computer readable medium comprising computer instructions stored thereon to cause one or more processing units to receive a cross-protocol communication history for a user; receive a message from the user addressed to one or more desired recipients; determine, based on the cross-protocol communication history for the user, an optimal protocol for delivery of the message for each of the one or more desired recipients, wherein the instructions to determine further comprise instructions to use a predictive time-based data model; transform the message into the respective optimal delivery protocol for each of the one or more desired recipients; transmit the message in the respective optimal delivery protocol to each of the one or more desired recipients; and update the cross-protocol communication history for the user and the predictive time-based data model based, at least in part, on the transmission of the message.

Example 2 includes the subject matter of example 1, wherein the cross-protocol communication history for the user comprises at least one of the following: a frequency of communication protocol usage; a time of day of communication; a historic rate of response; and a pattern of group communications.

Example 3 includes the subject matter of example 1, wherein the instructions to determine an optimal protocol for delivery comprise instructions to analyze historic patterns of communication of the user based on context; analyze historic patterns of communication of the one or more desired recipients based on context; and determine the intersection of the historic patterns of the user and historic patterns of the one or more desired recipients.

Example 4 includes the subject matter of example 3, wherein the context comprises at least one of the following: geo-locational information, time of day, and content of the message.

Example 5 includes the subject matter of example 1, wherein the instructions to determine are executed at a set interval of time based, at least in part, on the predictive time-based data model.

Example 6 includes the subject matter of example 1, wherein the optimal protocol for delivery of the message for at least one of the one or more desired recipients comprises at least one of the following protocols: Short Message Service (SMS); email; instant messaging; and voice mail.

Example 7 includes the subject matter for example 1, wherein the predictive time-based data model comprises a factorization machine.

Example 8 is an apparatus comprising a memory; and one or more processing units, communicatively coupled to the memory wherein the memory stores instructions to configure the one or more processing units to: receive a cross protocol communication history for a user; receive a message from the user addressed to one or more desired recipients; determine, based on the cross platform communication history for the user, an optimal protocol for delivery of the message for each of the one or more desired recipients, wherein the instructions to determine further comprise instructions to use a predictive time-based data model; transform the message into the respective optimal delivery protocol for each of the one or more desired recipients; transmit the message in the respective optimal delivery protocol to each of the one or more desired recipients; and update the cross protocol communication history for the user and the predictive time-based data model based, at least in part, on the transmission of the message.

Example 9 includes the subject matter of example 8, wherein the cross protocol communication history comprises frequency of communication method, time of day of communication, historic rates of response, and patterns of group communication.

Example 10 includes the subject matter of example 8, wherein the instructions to determine comprises: analyze historic patterns of communication of the user based on context; analyze historic patterns of communication of the one or more desired recipients based on context; and determine the intersection of the historic patterns of the user, and historic patterns of the one or more desired recipients.

Example 11 includes the subject matter of example 10, wherein the context comprises at least one of the following: geo-locational information, time of day, and content of the message.

Example 12 includes the subject matter of example 8, wherein the instructions to determine are executed at a set interval of time based, at least in part, on the predictive time-based data model.

Example 13 includes the subject matter of example 8, wherein the optimal protocol for delivery of the message for at least one of the one or more desired recipients comprises at least one of the following protocols: Short Message Service (SMS); email; instant messaging; and voice mail.

Example 14 is a computer-implemented method for selecting optimal transmission of digital messages comprising: receiving a cross protocol communication history for a user; receiving a message from the user addressed to one or more desired recipients; determining, based on the cross-protocol communication history for the user, an optimal protocol for delivery of the message for each of the one or more desired recipients, wherein the instructions to determine further comprise instructions to use a predictive time-based data model; transforming the message into the respective optimal delivery protocol for each of the one or more desired recipients; transmitting the message in the respective optimal delivery digital protocol to each of the one or more desired recipients; and updating the cross protocol communication history for the user and the predictive time-based model based, at least in part, on the transmission of the message.

Example 15 includes the subject matter of example 14, wherein the cross protocol communication history comprises frequency of communication method, time of day of communication, historic rates of response, and patterns of group communication.

Example 16 includes the subject matter of example 14, wherein determining comprises: analyzing historic patterns of communication of the user based on context; analyzing historic patterns of communication of the one or more desired recipients based on context; and determining the intersection of the historic patterns of the user, and historic patterns of the one or more desired recipients.

Example 17 includes the subject matter of example 16, wherein the context comprises at least one of the following: geo-locational information, time of day, and content of the message.

Example 18 includes the subject matter of example 14, wherein the determining is executed at a set interval of time based, at least in part, on the predictive time-based data model.

Example 19 includes the subject matter of example 14, wherein the optimal protocol for delivery of the message for at least one of the one or more desired recipients comprises at least one of the following protocols: Short Message Service (SMS); email; instant messaging; and voice mail.

Example 20 includes the subject matter of example 14, wherein the predictive time-based data model comprises a factorization machine.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer instructions stored thereon to cause one or more processing units to:
   receive a cross-protocol communication history for a user;
   receive a message from the user addressed to one or more desired recipients;
   determine, based on the cross-protocol communication history for the user, an optimal protocol for delivery of the message for each of the one or more desired recipients, wherein the instructions to determine further comprise instructions to use a predictive time-based data model, and wherein the cross-protocol communication history for the user is associated with a Universal Message Object (UMO), which UMO comprises at least one of each of the following objects: a message common object, a message unique object, and a participant object;
   transform the message into the respective optimal delivery protocol for each of the one or more desired recipients;
   transmit the message in the respective optimal delivery protocol to each of the one or more desired recipients; and
   update the cross-protocol communication history for the user and the predictive time-based data model based, at least in part, on the transmission of the message.

2. The non-transitory computer readable medium of claim 1, wherein the cross-protocol communication history for the user comprises at least one of the following: a frequency of communication protocol usage; a time of day of communication; a historic rate of response; and a pattern of group communications.

3. The non-transitory computer readable medium of claim 1, wherein the instructions to determine an optimal protocol for delivery comprise instructions to:
   analyze historic patterns of communication of the user based on context;
   analyze historic patterns of communication of the one or more desired recipients based on context; and
   determine the intersection of the historic patterns of the user and the historic patterns of the one or more desired recipients.

4. The non-transitory computer readable medium of claim 3, wherein the context comprises at least one of the following: geo-locational information, time of day, and content of the message.

5. The non-transitory computer readable medium of claim 1, wherein the instructions to determine are executed at a set interval of time based, at least in part, on the predictive time-based data model.

6. The non-transitory computer readable medium of claim 1, wherein the optimal protocol for delivery of the message for at least one of the one or more desired recipients comprises at least one of the following protocols: Short Message Service (SMS); email; instant messaging; and voice mail.

7. The non-transitory computer readable medium of claim 1, wherein the predictive time-based data model comprises a factorization machine.

8. An apparatus comprising:
   a memory; and
   one or more processing units, communicatively coupled to the memory wherein the memory stores instructions to configure the one or more processing units to:
   receive a cross: protocol communication history for a user;
   receive a message from the user addressed to one or more desired recipients;
   determine, based on the cross-protocol communication history for the user, an optimal protocol for delivery of the message for each of the one or more desired recipients, wherein the instructions to determine further comprise instructions to use a predictive time-based data model, and wherein the cross-protocol communication history for the user is associated with a Universal Message Object (UMO), which UMO comprises at least one of each of the following objects: a message common object, a message unique object, and a participant object;
   transform the message into the respective optimal delivery protocol for each of the one or more desired recipients;
   transmit the message in the respective optimal delivery protocol to each of the one or more desired recipients; and
   update the cross: protocol communication history for the user and the predictive time-based data model based, at least in part, on the transmission of the message.

9. The apparatus of claim 8, wherein the cross: protocol communication history comprises frequency of communication method, time of day of communication, historic rates of response, and patterns of group communication.

10. The apparatus of claim 8, wherein the instructions to determine comprise instructions to:
    analyze historic patterns of communication of the user based on context;
    analyze historic patterns of communication of the one or more desired recipients based on context; and
    determine the intersection of the historic patterns of the user and the historic patterns of the one or more desired recipients.

11. The apparatus of claim 10, wherein the context comprises at least one of the following: geo-locational information, time of day, and content of the message.

12. The apparatus of claim 8, wherein the instructions to determine are executed at a set interval of time based, at least in part, on the predictive time-based data model.

13. The apparatus of claim 8, wherein the optimal protocol for delivery of the message for at least one of the one or more desired recipients comprises at least one of the following protocols: Short Message Service (SMS); email; instant messaging; and voice mail.

14. A computer-implemented method for selecting optimal transmission of digital messages comprising:
    receiving a cross protocol communication history for a user;
    receiving a message from the user addressed to one or more desired recipients;
    determining, based on the cross-protocol communication history for the user, an optimal protocol for delivery of the message for each of the one or more desired recipients, wherein determining further comprises using a predictive time-based data model, and wherein the cross-protocol communication history for the user is associated with a Universal Message Object (UMO), which UMO comprises at least one of each of the following objects: a message common object, a message unique object, and a participant object;
    transforming the message into the respective optimal delivery protocol for each of the one or more desired recipients;
    transmitting the message in the respective optimal delivery digital protocol to each of the one or more desired recipients; and
    updating the cross protocol communication history for the user and the predictive time-based model based, at least in part, on the transmission of the message.

15. The computer-implemented method of claim 14, wherein the cross: protocol communication history comprises frequency of communication method, time of day of communication, historic rates of response, and patterns of group communication.

16. The computer-implemented method of claim 14, wherein determining comprises:
    analyzing historic patterns of communication of the user based on context;
    analyzing historic patterns of communication of the one or more desired recipients based on context; and
    determining the intersection of the historic patterns of the user and the historic patterns of the one or more desired recipients.

17. The computer-implemented method of claim 16, wherein the context comprises at least one of the following: geo-locational information, time of day, and content of the message.

18. The computer-implemented method of claim 14, wherein the determining is executed at a set interval of time based, at least in part, on the predictive time-based data model.

19. The computer-implemented method of claim 14, wherein the optimal protocol for delivery of the message for at least one of the one or more desired recipients comprises at least one of the following protocols: Short Message Service (SMS); email; instant messaging; and voice mail.

20. The computer-implemented method of claim 14, wherein the predictive time-based data model comprises a factorization machine.

* * * * *